US011946638B1

(12) United States Patent
Li

(10) Patent No.: US 11,946,638 B1
(45) Date of Patent: Apr. 2, 2024

(54) METEOR PROJECTION STRUCTURE AND METEOR LAMP

(71) Applicant: LONVIS TECHNOLOGY (SHENZHEN) CO., LTD., Guangdong (CN)

(72) Inventor: Xuequan Li, Guangdong (CN)

(73) Assignee: LONVIS TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/132,833

(22) Filed: Apr. 10, 2023

(30) Foreign Application Priority Data

Jan. 10, 2023 (CN) ........................ 202320072957.1

(51) Int. Cl.

| | |
|---|---|
| ***F21S 10/06*** | (2006.01) |
| ***F21V 7/04*** | (2006.01) |
| ***F21V 14/00*** | (2018.01) |
| ***F21V 14/04*** | (2006.01) |
| ***F21V 17/02*** | (2006.01) |
| *F21Y 113/13* | (2016.01) |

(52) U.S. Cl.
CPC ............ *F21V 7/048* (2013.01); *F21V 14/006* (2013.01); *F21V 14/04* (2013.01); *F21V 17/02* (2013.01); *F21Y 2113/13* (2016.08)

(58) Field of Classification Search
CPC ........ F21S 10/007; F21S 10/06; F21S 10/063; F21V 14/006; F21V 14/04
See application file for complete search history.

(56) References Cited

U.S. PATENT DOCUMENTS

| | | | | |
|---|---|---|---|---|
| 10,041,651 | B1 * | 8/2018 | Xi | F21S 10/00 |
| 11,221,117 | B1 * | 1/2022 | Xu | F21V 14/04 |
| 2003/0151788 | A1 * | 8/2003 | Claus | G06K 7/10683 235/462.39 |
| 2023/0102963 | A1 * | 3/2023 | Lin | F21V 7/0083 362/59 |

* cited by examiner

*Primary Examiner* — Sean P Gramling

(57) ABSTRACT

The present disclosure provides a meteor projection structure, which includes at least one polygonal reflecting wheel, at least one laser device, at least one light-permeable sheet and at least one motor. At least one side of the polygonal reflecting wheel is provided with a reflecting surface, a light emitted by the laser device is first reflected by the reflecting surface, and then emitted by the light-permeable sheet, wherein the light-permeable sheet intersects with an emergent light path; the motor is connected with the polygonal reflecting wheel through a transmission mechanism. A meteor lamp is further provided, which includes a housing and the meteor projection structure as described above. In the present disclosure, the motor drives the polygonal reflecting wheel to rotate; when a laser emitted by the laser device passes through the rotating polygonal reflecting wheel.

15 Claims, 9 Drawing Sheets

METEOR PROJECTION STRUCTURE AND METEOR LAMP

CROSS-REFERENCE TO RELATED APPLICATION

This application claims priority from the Chinese patent application 202320072957.1 filed Jan. 10, 2023, the content of which is incorporated herein in the entirety by reference.

TECHNICAL FIELD

The present disclosure relates to the field of a projection lamp, and in particular to a meteor projection structure and a meteor lamp.

BACKGROUND

In order to adapt to various environmental occasions, people usually use a variety of lamps for decoration and projection, thereby creating an appropriate scene atmosphere. There are many kinds of projection lamps in the market, wherein most of the existing meteor lamps have complex structures, and the amount of projected meteors is small, with monotonous style and unsatisfactory viewing effects.

SUMMARY

Aiming at the shortcomings of the prior art, the present disclosure provides a meteor projection structure and a meteor lamp, they can produce a moving meteor effect, with simple structure and satisfactory viewing effects.

The technical solution of the present disclosure is implemented as follows:

A meteor projection structure, comprising at least one polygonal reflecting wheel, at least one laser device, at least one light-permeable sheet and at least one motor; wherein, at least one side of the polygonal reflecting wheel is provided with a reflecting surface, a light emitted by the laser device is first reflected by the reflecting surface, and then emitted by the light-permeable sheet, wherein the light-permeable sheet intersects with an emergent light path; the motor is connected with the polygonal reflecting wheel through a transmission mechanism.

In a preferred embodiment of the present disclosure, a vertical position of the laser device is located between a center of the polygonal reflecting wheel and the reflecting surface.

In a preferred embodiment of the present disclosure, the vertical position of the laser device is located at a center of a radius of its corresponding polygonal reflecting wheel.

In a preferred embodiment of the present disclosure, the quantity of the polygonal reflecting wheel is one, and the quantity of the laser device is at least two.

In a preferred embodiment of the present disclosure, the transmission mechanism is a connecting shaft, and one end of the connecting shaft is connected with the motor, and the other end of the connecting shaft is connected with the polygonal reflecting wheel.

In a preferred embodiment of the present disclosure, the transmission mechanism comprises several gears and transmission shafts, one end of the transmission shaft is connected with the polygonal reflecting wheel, and the other end of the transmission shaft is connected with the gear, and the gear is connected with the motor.

In a preferred embodiment of the present disclosure, the transmission mechanism comprises a transmission shaft, a driving pulley, a synchronous pulley and a conveyor belt; one end of the transmission shaft is connected with the polygonal reflecting wheel, and the other end of the transmission shaft is connected with the synchronous pulley; the driving pulley is configured on an output shaft of the motor, and the conveyor belt is connected with the synchronous pulley and the driving pulley.

In a preferred embodiment of the present disclosure, the quantity of the polygonal reflecting wheels are multiple, and the quantity of the laser devices correspond to the quantity of the polygonal reflecting wheels.

In a preferred embodiment of the present disclosure, the quantity of the motors correspond to the quantity of the polygonal reflecting wheels, and one of the motors is fixedly connected with one of the polygonal reflecting wheels through a connecting shaft.

In a preferred embodiment of the present disclosure, the transmission mechanism comprises several gears and transmission shafts, one of the gears is connected with one of the polygonal reflecting wheels through the transmission shaft, and a plurality of the gears are engaged and connected with the motor through the transmission shaft.

In a preferred embodiment of the present disclosure, the transmission mechanism comprises several transmission shafts, several synchronous pulleys, driving pulleys and conveyor belts, one end of one of the transmission shafts is connected with one of the polygonal reflecting wheels, the other end of the one of the transmission shafts is connected with one of the synchronous pulleys; the driving pulley is configured on an output shaft of the motor, and the conveyor belt is connected with the driving pulley and the synchronous pulley.

In a preferred embodiment of the present disclosure, the meteor projection structure further comprises a control unit, wherein the control unit is electrically connected with the laser device and the motor.

In a preferred embodiment of the present disclosure, the light-permeable sheet is a grating sheet, and the grating sheet is provided with light-permeable textures.

In a preferred embodiment of the present disclosure, the textures are linear grooves moving along the light path and/or other preset patterns.

In a preferred embodiment of the present disclosure, the quantity of the linear grooves are multiple.

In a preferred embodiment of the present disclosure, the laser device is any one or more of a red laser device, a green laser device, a blue laser device, a blue-violet laser device, a yellow laser device and an infrared laser device.

A meteor lamp comprises a housing and the meteor projection structure as described above.

Compared with the prior art, the present disclosure has the following advantages:

The present disclosure provides a meteor projection structure, which includes at least one polygonal reflecting wheel, at least one laser device, at least one light-permeable sheet and at least one motor; wherein, at least one side of the polygonal reflecting wheel is provided with a reflecting surface, a light emitted by the laser device is first reflected by the reflecting surface, and then emitted by the light-permeable sheet, wherein the light-permeable sheet intersects with an emergent light path; the motor is connected with the polygonal reflecting wheel through a transmission mechanism. In the present disclosure, the motor drives the polygonal reflecting wheel to rotate; when a laser emitted by the laser device passes through the rotating polygonal reflecting wheel, the corresponding light will continually change its position with the movement of the reflecting surface, and will be emitted through the light-permeable sheet. Since the change of the light is dynamic, in the process of the light passing through the light-permeable sheet, a motion trail of the light moves from one end of the light-permeable sheet to the other, where the light path is changed by continuous light movement. In the case that the light-permeable sheet is a grating sheet, and the grating sheet is provided with slender and straight textures, the light path slides from one end to the other, that is, a meteor effect is formed, with good visual effects.

BRIEF DESCRIPTION OF THE DRAWINGS

In order to illustrate the embodiments of the present disclosure or the technical solution in the prior art more explicitly, the drawings required in the description of the embodiments or the prior art will be briefly introduced below. Obviously, the drawings in the following description are only some embodiments of the disclosure, and other drawings can be obtained by those skilled in the art without creative works, based on these drawings.

Reference numbers: 1—polygonal reflecting wheel, 2—laser device, 3—light-permeable sheet, 4—motor, 5—transmission mechanism.

DETAILED DESCRIPTION OF EMBODIMENTS

In the following, the technical solutions in the embodiments of the disclosure will be described clearly and completely in conjunction with the drawings. Obviously, the described embodiments are only a few of the embodiments of this disclosure, but not all of the embodiments. Based on the embodiments of the present disclosure, all other embodiments obtained by those skilled in the art without creative works fall within the protection scope of the present disclosure.

Figure 1:
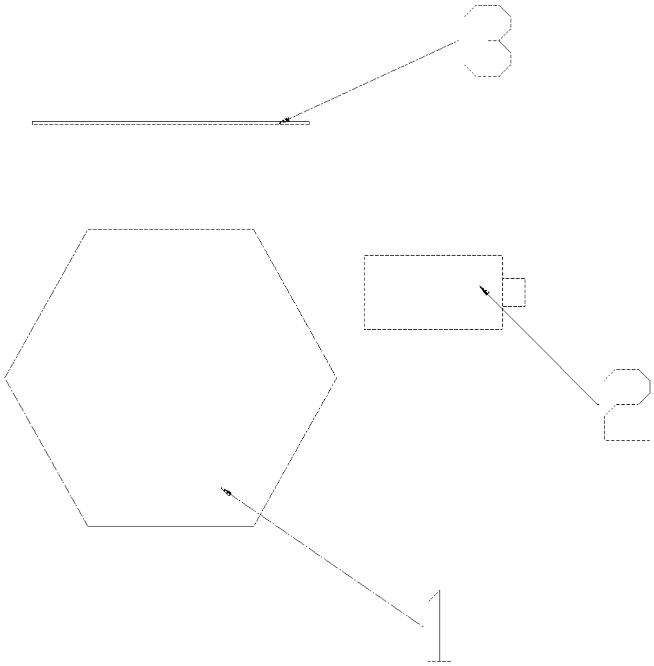
FIG. 1 is a schematic diagram showing an embodiment where there are only one polygonal reflecting wheel and one laser device in the present disclosure.

Referring to FIG. 1, the embodiments of the present disclosure disclose a meteor projection structure, comprising at least one polygonal reflecting wheel 1, at least one laser device 2, at least one light-permeable sheet 3 and at least one motor 4; at least one side of the polygonal reflecting wheel 1 is provided with a reflecting surface, a light emitted by the laser device 2 is first reflected by the reflecting surface, and then emitted by the light-permeable sheet 3, wherein the light-permeable sheet 3 intersects with an emergent light path; the motor 4 is connected with the polygonal reflecting wheel 1 through a transmission mechanism 5. In use, the motor 4 drives the polygonal reflecting wheel 1 to rotate; when a laser emitted by the laser device 2 passes through the rotating polygonal reflecting wheel 1, the corresponding light will continually change its position with the movement of the reflecting surface of the polygonal reflecting wheel 1, and will be refracted to the light-permeable sheet 3 through the reflecting surface of the polygonal reflecting wheel 1, and then be emitted through the light-permeable sheet 3. Since the change of the light is dynamic, in the process of the light passing through the light-permeable sheet, a motion trail of the light moves from one end of the light-permeable sheet to the other, wherein the light path changed by continuous light movement forms the meteor effect. In this case, the quantity of the sides of the polygonal reflecting wheel 1 is at least 3, where the more sides of the polygonal reflecting wheel 1 are, the more meteors are transmitted at the same time, but the shorter the travel and time of the meteors for one-time; the less sides of the polygonal reflecting wheel 1 are, the opposite results will be obtained. Those skilled in the art can select the polygonal reflecting wheel 1 with different numbers of sides in accordance with the design requirements. In order to achieve better meteor effect, preferably, the polygonal reflecting wheel 1 has six sides, and the quantity of reflecting surfaces is equal to the quantity of sides of the polygonal reflecting wheel 1, which is six as well. In this way, a single polygonal reflecting wheel 1 can project a meteor effect for six times when it rotates a revolution under the drive of the motor 4. Moreover, the frequency of emergence of meteors varies with the rotation speed of the motor 4. In this case, a better meteor effect can be projected, showing wonderful visual effects.

Furthermore, a vertical position of the laser device 2 is located between a center of the polygonal reflecting wheel 1 and the reflecting surface. Preferably, the vertical position of the laser device 2 is located at a center of a radius of its corresponding polygonal reflecting wheel 1. The laser device 2 at this position is the most preferred, which can ensure the utilization area of the reflecting surface in the polygonal reflecting wheel 1 to the greatest extent, so as to project a uniform and beautiful meteor effect.

More preferably, when the quantity of the polygonal reflecting wheel 1 is one, and the quantity of the laser device 2 is one, it can ensure that it occupies less space under better meteor projection effect.

Embodiment 1

Figure 2:
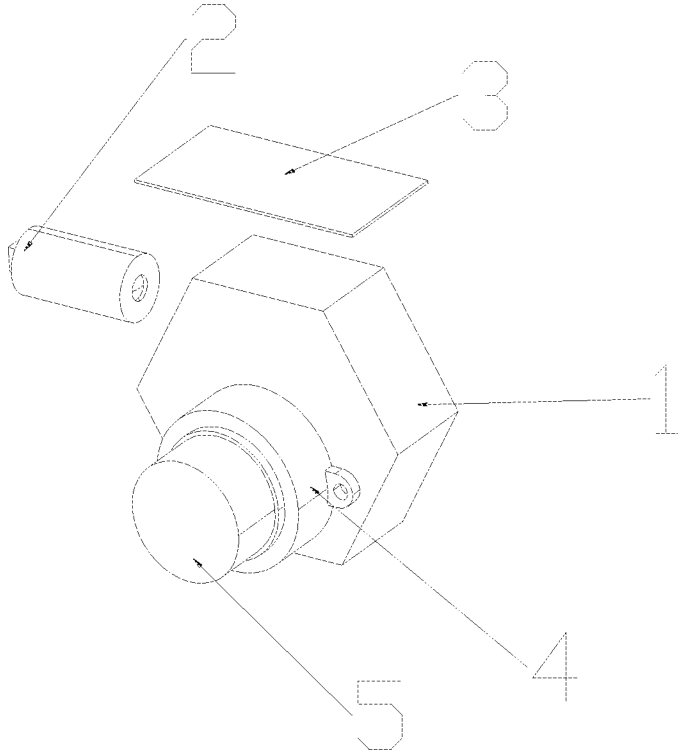
FIG. 2 is a schematic diagram of a structure of Embodiment 1 in the present disclosure.

As shown in FIG. 2, preferably, the transmission mechanism 5 is a connecting shaft, and one end of the connecting shaft is connected with the motor 4, and the other end of the connecting shaft is connected with the polygonal reflecting wheel 1. The direct connection of the motor 4 and the polygonal reflecting wheel 1 with the connecting shaft may well saved the occupied space of the whole structure without adversely affecting the projection effect of the meteors.

Embodiment 2

Preferably, the transmission mechanism 5 comprises several gears and transmission shafts, one end of the transmission shaft is connected with the polygonal reflecting wheel 1, and the other end of the transmission shaft is connected with the gear, and the gear is connected with the motor 4. In this embodiment, the combination of the gear and the transmission shaft is utilized as the transmission mechanism, so that the rotation speeds of different reflecting wheels can be well adjusted, the frequency of emergence of meteors can be accelerated, and the use requirement of the rotation speed can be met.

Embodiment 3

Preferably, the transmission mechanism 5 comprises a transmission shaft, a driving pulley, a synchronous pulley and a conveyor belt; one end of the transmission shaft is connected with the polygonal reflecting wheel 1, and the other end of the transmission shaft is connected with the synchronous pulley; the driving pulley is configured on an output shaft of the motor 4, and the conveyor belt is connected with the synchronous pulley and the driving pulley. In this embodiment, the combination of the transmission shaft, the driving pulley, the synchronous pulley and the conveyor belt is utilized as the transmission mechanism, and the driving pulley is configured on an output shaft of the motor 4. Under the effect of the conveyor belt, the synchronous pulley is driven by the driving pulley, so that the rotation speed of the reflecting wheel can be adjusted well, the frequency of emergence of meteors can be accelerated, so as to meet the use requirement of different rotation speeds.

Figure 3:
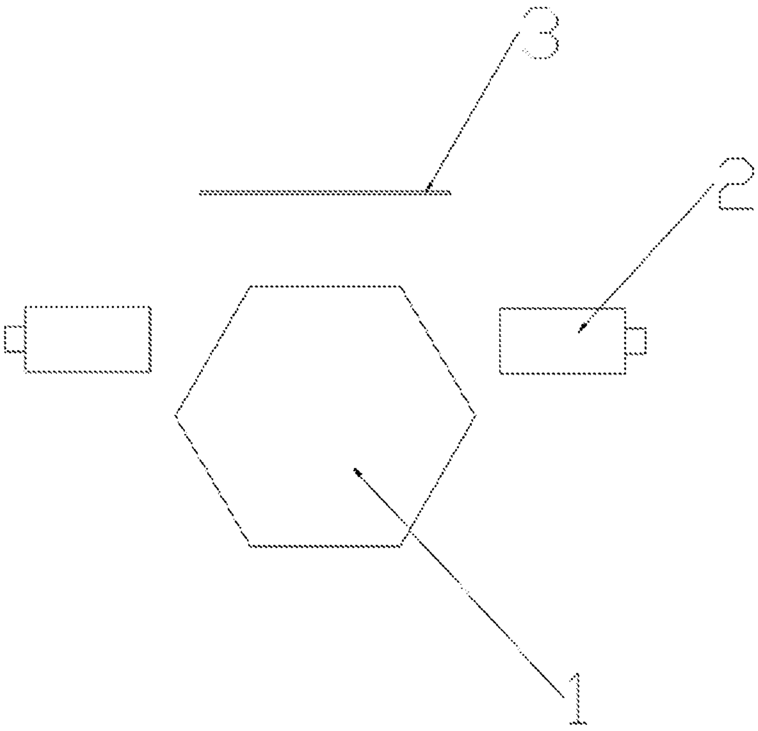
FIG. 3 is a schematic diagram showing an embodiment where there are one polygonal reflecting wheel and two laser devices in the present disclosure.

As shown in FIG. 3, when the quantity of the polygonal reflecting wheel 1 is one, and the quantity of the laser device 2 is at least two, one revolution of the polygonal reflecting wheel 1 can produce twice as many meteors as in Embodiment 1.

Embodiment 4

Figure 4:
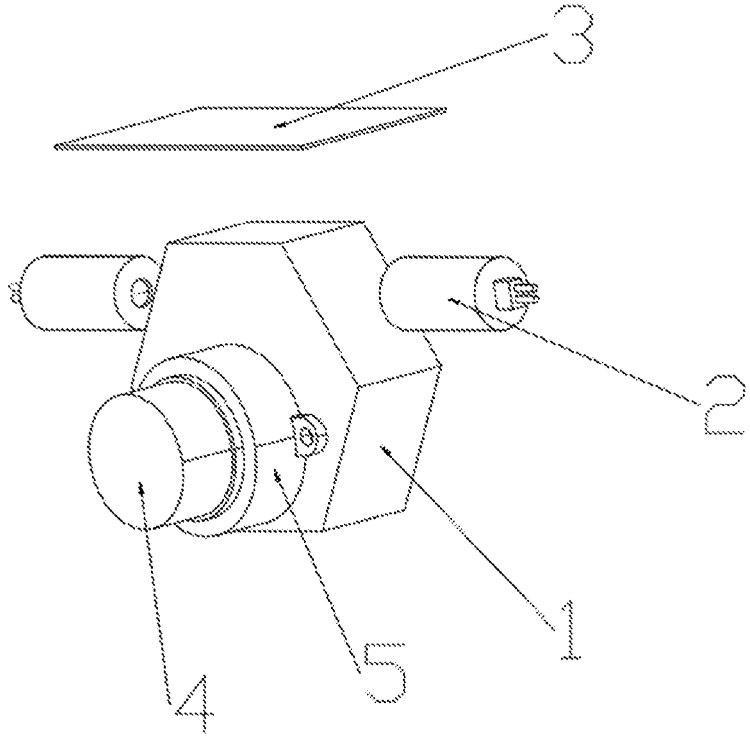
FIG. 4 is a schematic diagram of a structure of Embodiment 4 in the present disclosure.

As shown in FIG. 4, specifically, the configuration of the transmission mechanism is the same as that of Embodiment 1, an additional laser device 2 is added on the basis of Embodiment 1, which can correspondingly project twice as many meteors under the same occupied area and rotating speed, thereby obtaining a denser meteor effect.

Embodiment 5

Figure 5:
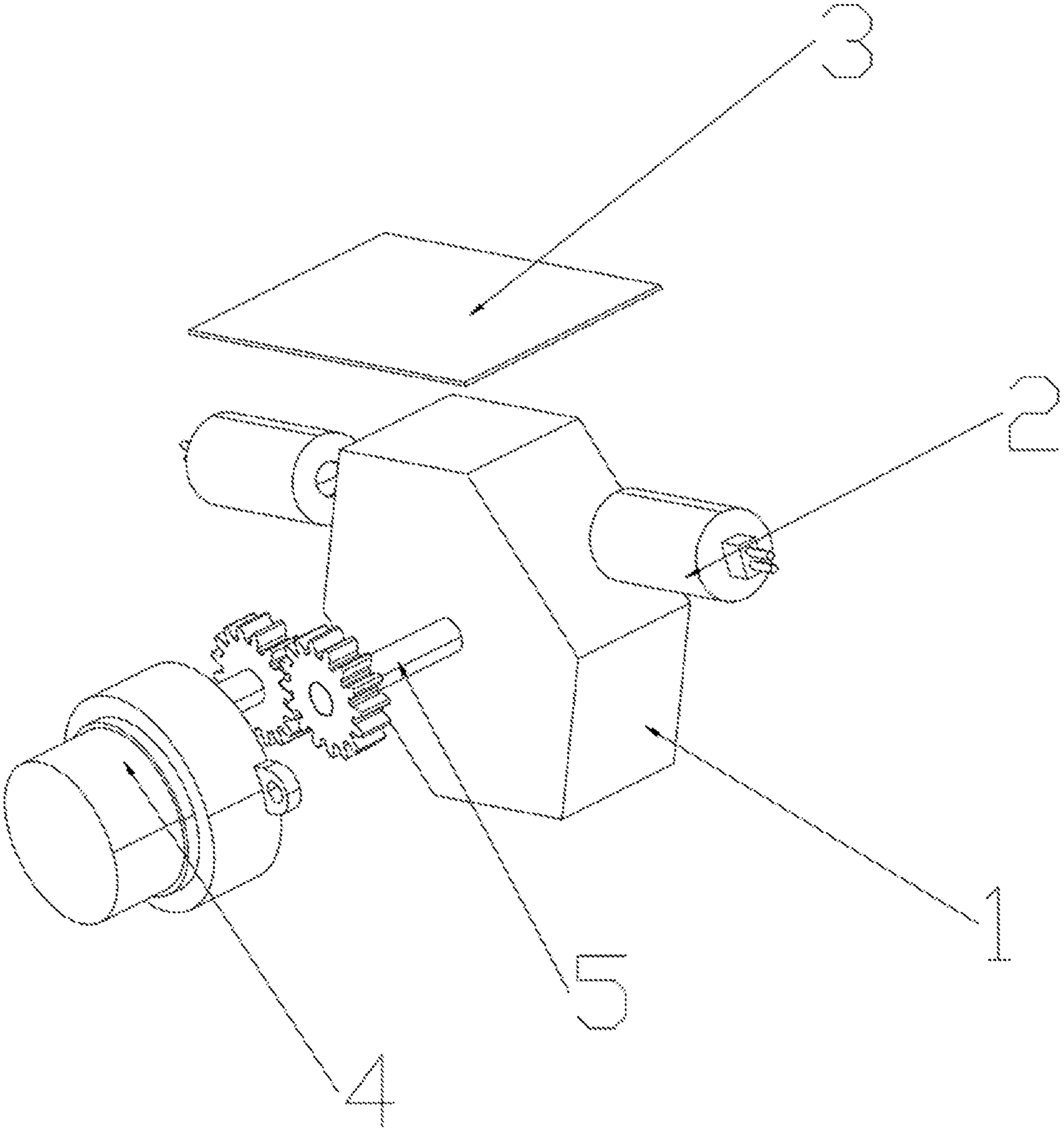
FIG. 5 is a schematic diagram of a structure of Embodiment 5 in the present disclosure.

As shown in FIG. 5, specifically, the configuration of the transmission mechanism is the same as that of Embodiment 2, an additional laser device 2 is added on the basis of Embodiment 2. In the case where the gear and the transmission shaft are combined as the transmission mechanism 5, on the one hand, the rotation speed of the polygonal reflecting wheel 1 can be adjusted, so that the frequency of emergence of meteors can be accelerated, and on the other hand, the meteor amount can be projected twice as many as that of Embodiment 2.

Embodiment 6

Figure 6:
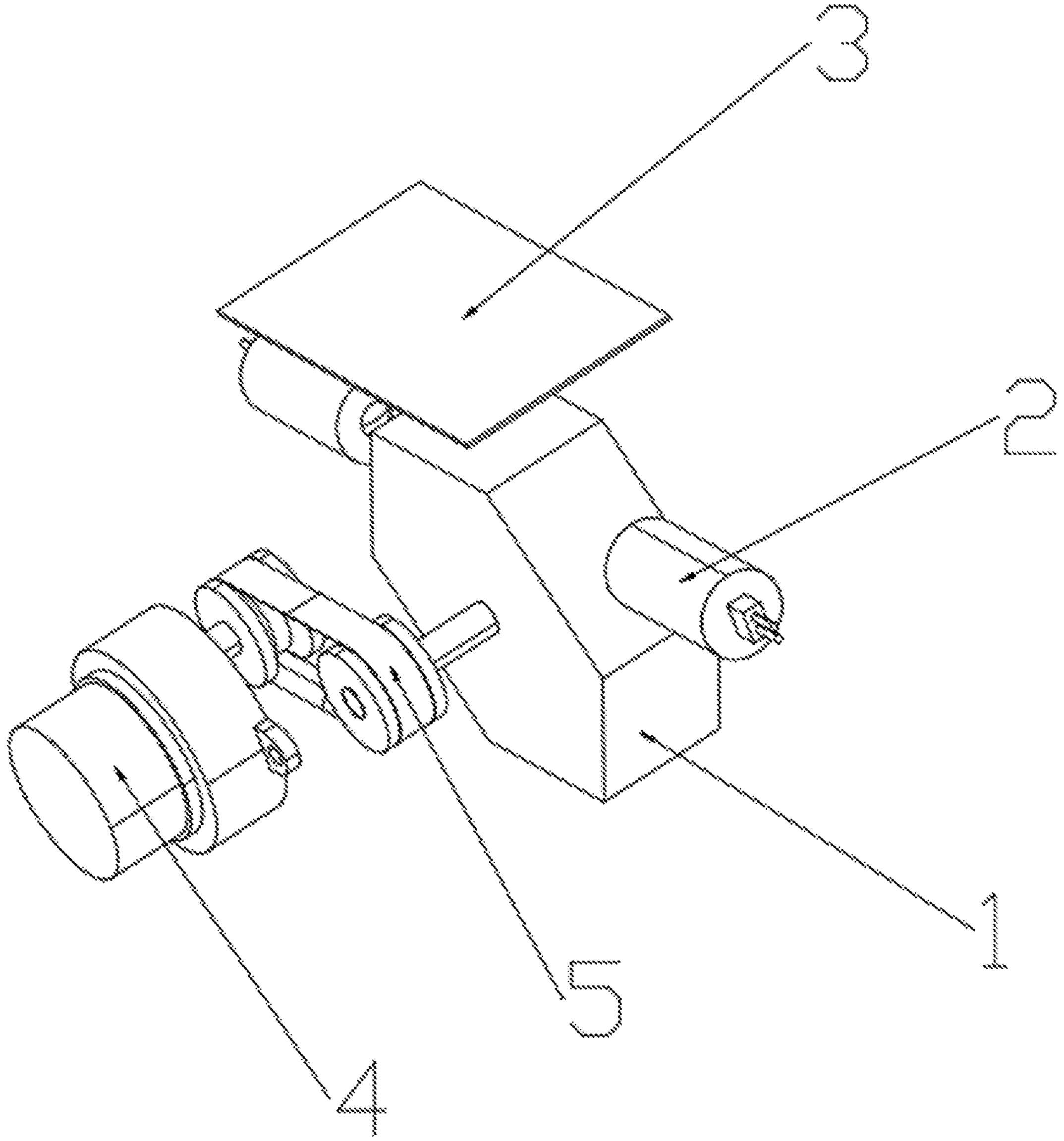
FIG. 6 is a schematic diagram of a structure of Embodiment 6 in the present disclosure.

As shown in FIG. 6, specifically, the configuration of the transmission mechanism is the same as that of Embodiment 3, an additional laser device 2 is added on the basis of Embodiment 3. Under the effect of the conveyor belt, the synchronous pulley is driven by the driving pulley, so that the rotation speed of the reflecting wheel can be adjusted well, the frequency of emergence of meteors can be accelerated, so as to meet the use requirement of different rotation speeds. Additionally, the meteor amount can be projected twice as many as that of Embodiment 3.

Furthermore, the quantity of the polygonal reflecting wheels 1 are multiple, and the quantity of the laser devices 2 correspond to the quantity of the polygonal reflecting wheels 1. The vertical position of the laser device 2 is located between the center of the corresponding polygonal reflecting wheel 1 and the reflecting surface. A plurality of the polygonal reflecting wheels 1 and the laser devices 2 are used in combination, so that one revolution of the polygonal reflecting wheel 1 can produce many times as many meteors as in Embodiment 1. More meteors can be projected, thereby forming the effect of meteor shower.

Embodiment 7

Specifically, the quantity of the motors 4 correspond to the quantity of the polygonal reflecting wheels 1, and one of the motors 4 is fixedly connected with one of the polygonal reflecting wheels 1 through a connecting shaft.

Embodiment 8

Figure 7:
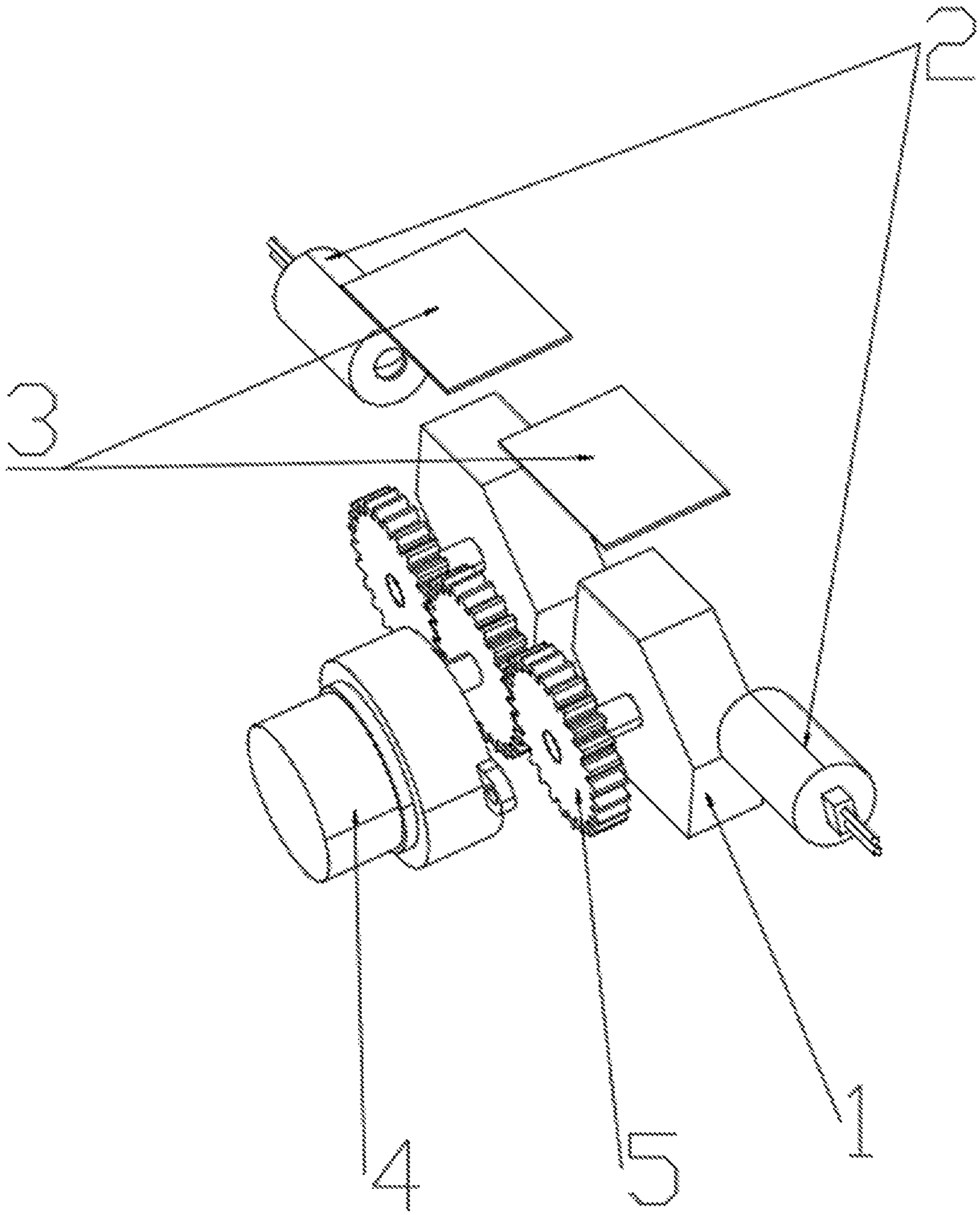
FIG. 7 is a schematic diagram of a structure of Embodiment 8 in the present disclosure.

As shown in FIG. 7, the transmission mechanism 5 comprises several gears and transmission shafts, one of the gears is connected with one of the polygonal reflecting wheels 1 through the transmission shaft, and a plurality of the gears are engaged and connected with the motor 4 through the transmission shaft. In this embodiment, the arrangement of a plurality of the polygonal reflecting wheels 1 is arranged side by side. One motor and a plurality of gears drive a plurality of the polygonal reflecting wheels 1 to rotate, so that the space can be rationally utilized, the rotation rate of the reflecting wheels can be adjusted, and the material costs of the motor can be effectively saved, with meteor effects with different flow rates being projected.

Embodiment 9

Figure 8:
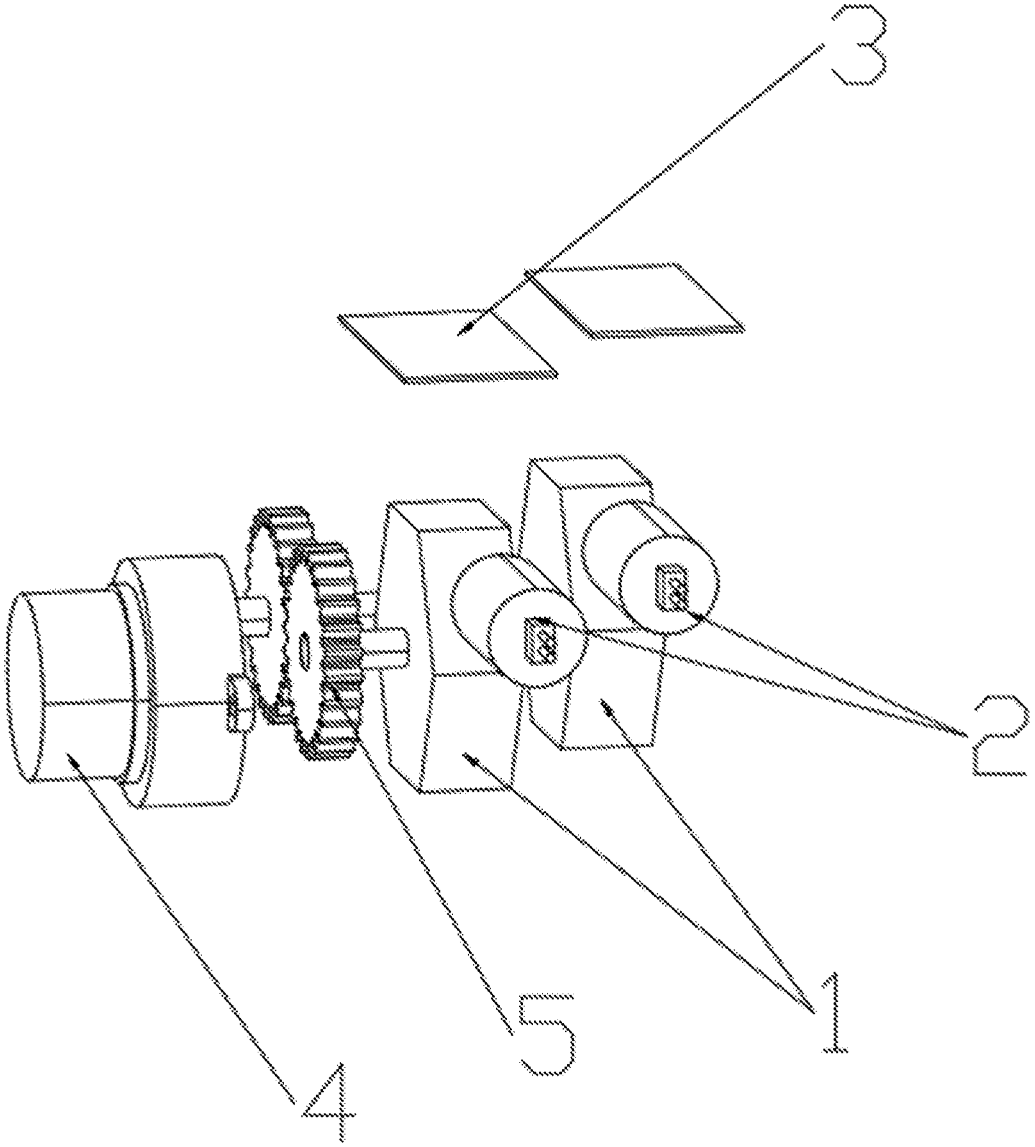
FIG. 8 is a schematic diagram of a structure of Embodiment 9 in the present disclosure.

As shown in FIG. 8, the transmission mechanism 5 of this embodiment is the same as that of Embodiment 8, and the arrangement of a plurality of the polygonal reflecting wheels 1 is front-back arrangement. In the case of the same transmission mechanism 5, it is also possible to adjust the rotation rate of a plurality of reflecting wheels and project meteor effects with different flow rates.

Embodiment 10

Figure 9:
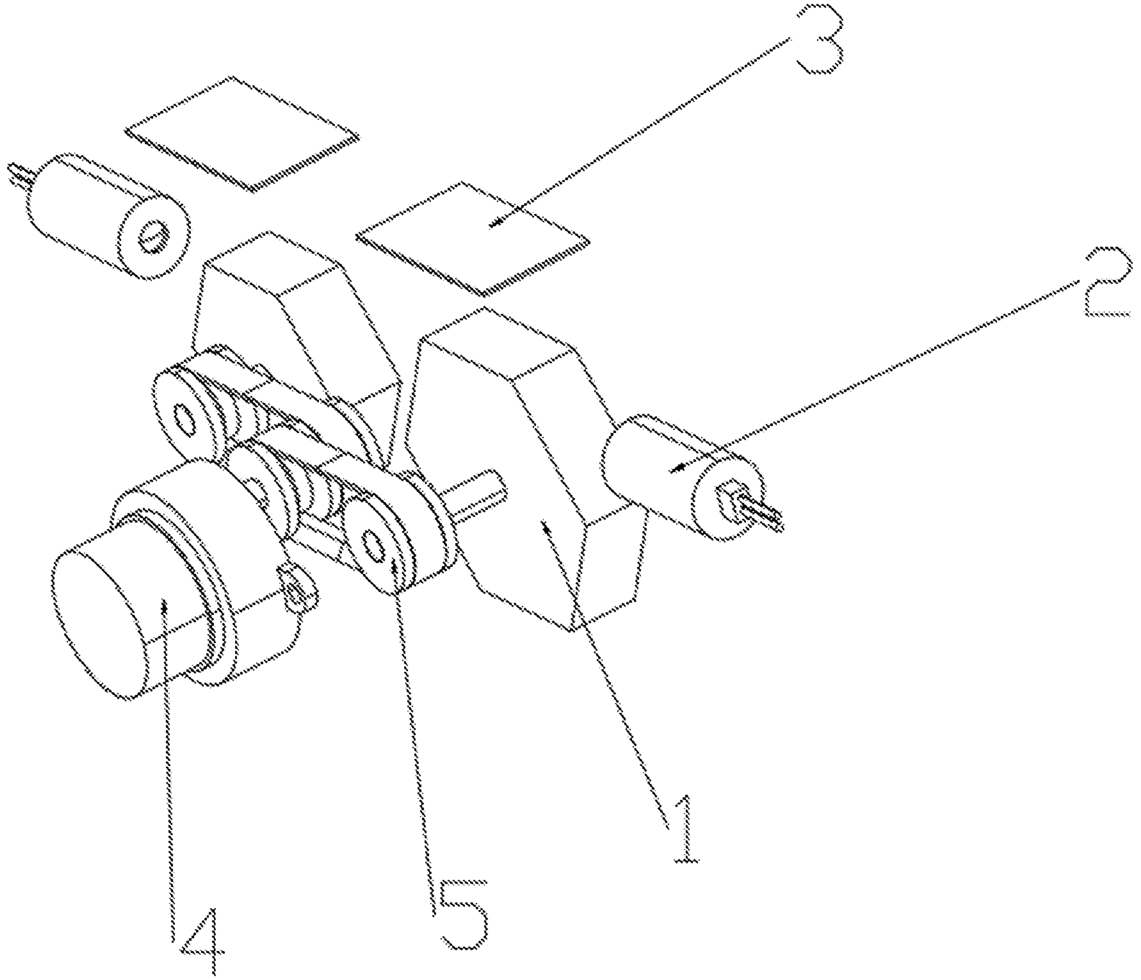
FIG. 9 is a schematic diagram of a structure of Embodiment 10 in the present disclosure.

As shown in FIG. 9, the transmission mechanism 5 comprises several transmission shafts, several synchronous pulleys, driving pulleys and conveyor belts, one end of one of the transmission shafts is connected with one of the polygonal reflecting wheels 1, the other end of the one of the transmission shafts is connected with one of the synchronous pulleys; the driving pulley is configured on an output shaft of the motor 4, and the conveyor belt is connected with the driving pulley and the synchronous pulley. In this embodiment, the arrangement of a plurality of the polygonal reflecting wheels 1 is arranged side by side. One motor, several transmission shafts, several synchronous pulleys, driving pulleys and conveyor belts collectively drive a plurality of the polygonal reflecting wheels 1 to rotate, so that the space can be rationally utilized, the rotation rate of the reflecting wheels can be adjusted, and the material costs of the motor can be effectively saved, with more meteors being projected.

Embodiment 11

Figure 10:
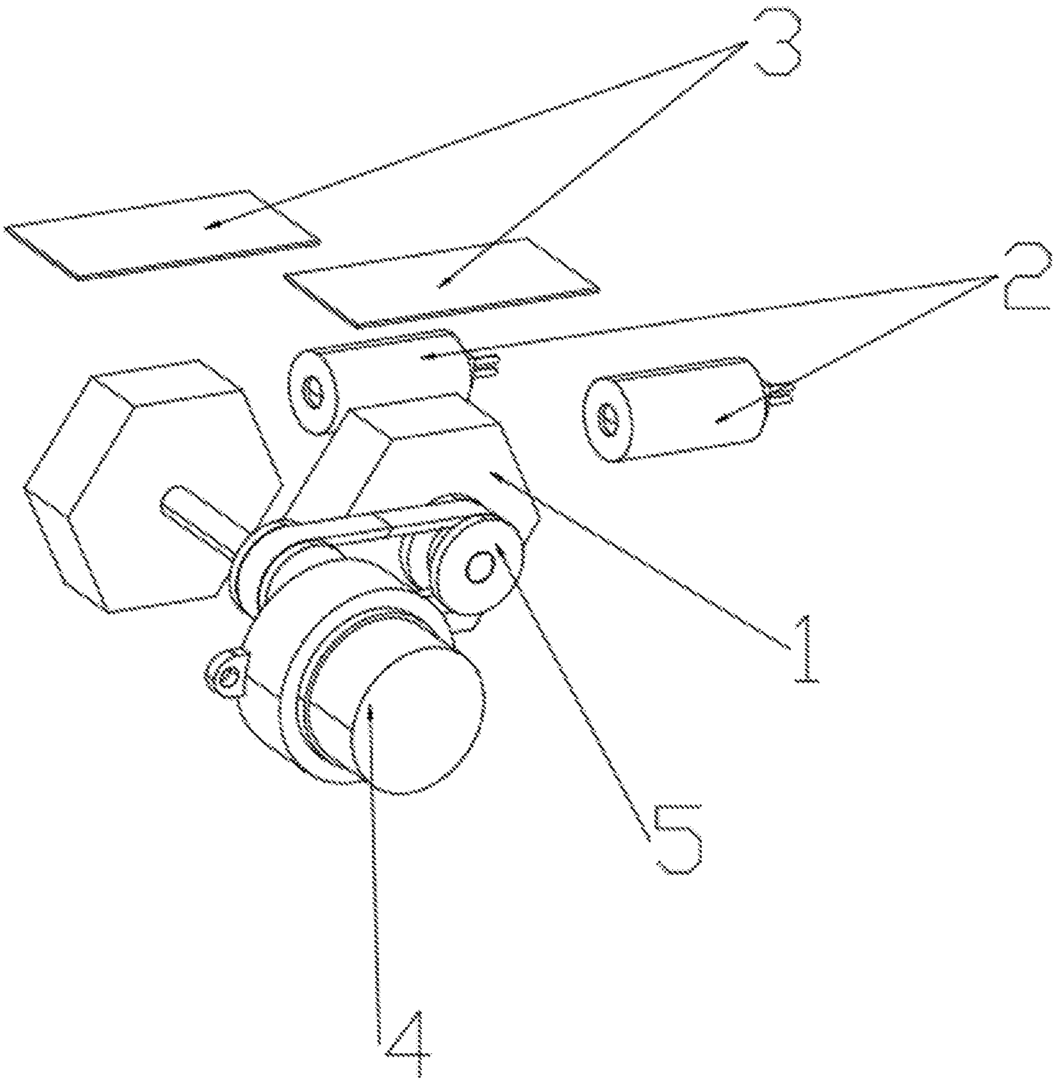
FIG. 10 is a schematic diagram of a structure of Embodiment 11 in the present disclosure.

As shown in FIG. 10, the transmission mechanism 5 of this embodiment is the same as that of Embodiment 10, and the arrangement of a plurality of the polygonal reflecting wheels 1 is front-back arrangement. In the case of the same transmission mechanism 5, it is also possible to adjust the rotation rate of a plurality of reflecting wheels and project different meteor effects.

Figure 11:
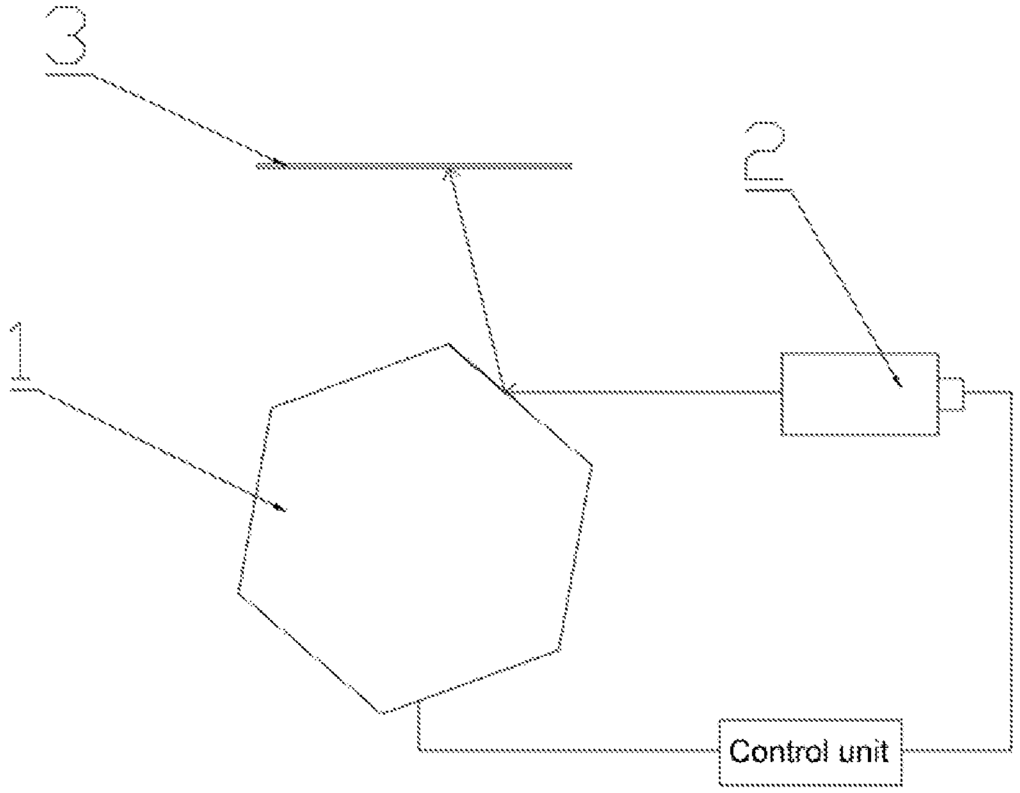
FIG. 11 is a functional schematic diagram of the present disclosure.

As shown in FIG. 11, moreover, the meteor projection structure further includes a control unit, wherein the control unit is electrically connected with the laser device 2 and the motor 4. In this case, the control unit is configured to control the opening and closing and light intensity of the laser device 2 and adjust the brightness of the meteor; and, the control unit is configured to control the rotation speed of the motor 4, so as to adjust the frequency of meteor generation.

Furthermore, the light-permeable sheet 3 is a grating sheet, and the grating sheet is provided with light-permeable textures.

Furthermore, the textures are linear grooves moving along the light path and/or other preset patterns. Preferably, the quantity of the linear grooves are multiple. In this case, when the textures are multiple linear grooves moving along the light path, the effect of meteors can be projected; when the textures are other preset patterns, the effect of graphics movement can be projected, so as to meet the needs of users.

Furthermore, the laser device 2 is any one or more of a red laser device, a green laser device, a blue laser device, a blue-violet laser device, a yellow laser device and an infrared laser device. Users can select the laser devices 2 with different colors as color light sources of meteors according to their own preferences, and create beautiful meteor effects.

A meteor lamp includes a housing and the meteor projection structure as described above.

Working Mechanism:

In use, the motor 4 drives the polygonal reflecting wheel 1 to rotate; when a laser emitted by the laser device 2 passes through the rotating polygonal reflecting wheel 1, the corresponding light will continually change its position with the movement of the reflecting surface of the polygonal reflecting wheel 1, and will be refracted to the light-permeable sheet 3 through the reflecting surface of the polygonal reflecting wheel 1, and then be emitted through the light-permeable sheet 3. Since the change of the light is dynamic, in the process of the light passing through the light-permeable sheet, a motion trail of the light moves from one end of the light-permeable sheet to the other, wherein the light path changed by continuous light movement forms the meteor effect. Moreover, the polygonal reflecting wheel 1 with different numbers of sides are utilized, and the reflecting surface of the polygonal reflecting wheel 1 projects laser light, which can make the frequency of emergence of meteors different; and the rich colors of the laser device 2 can generate a beautiful meteor effect, which meets the viewing needs of users.

Although the technology has been described with reference to specific exemplary embodiments, it should be understood that the present disclosure as claimed should not be unduly limited to specific embodiments. In fact, it will be apparent to those skilled in the art that other embodiments and modifications of the present disclosure can be conceived without departing from the true spirit and scope of the present disclosure. It is intended that the appended claims be interpreted to encompass all such embodiments and equivalents.

What is claimed is:

1. A meteor projection structure, comprising at least one polygonal reflecting wheel (1), at least one laser device (2), at least one light-permeable sheet (3) and at least one motor (4), and a control unit electrically connected with the laser device (2) and the motor (4);

wherein the polygonal reflecting wheel (1) comprises a hexagonal prism having two hexagonal faces and six side faces, the six side faces comprising six rectangular faces perpendicular to the two hexagonal faces; and at least one of the six side surfaces is provided with a reflecting surface, a light emitted by the laser device (2) toward the polygonal reflecting wheel (1) is first reflected by the reflecting surface, and then emitted by the light-permeable sheet (3), wherein the light-permeable sheet (3) intersects with an emergent light path; the motor (4) is connected with the polygonal reflecting wheel (1) through a transmission mechanism (5);

wherein a vertical position of the laser device (2) is located between a center of the polygonal reflecting wheel (1) and the reflecting surface; and the vertical position of the laser device (2) is located at a center of a radius of the polygonal reflecting wheel (1);

wherein the light-permeable sheet (3) is a grating sheet, and the grating sheet is provided with light-permeable textures; the textures are linear grooves moving along the light path; and the quantity of the linear grooves are multiple;

wherein one end of the transmission mechanism is connected with the motor (4), and the other end of the transmission mechanism (4) is connected with the polygonal reflecting wheel (1); and wherein the motor and transmission mechanism are disposed on the same side of one of the two hexagonal faces; the motor (4) drives the polygonal reflecting wheel (1) to rotate so that when the light emitted by the laser device reflects off the rotating polygonal reflecting wheel, the corresponding light will continually change its position with the movement of the reflecting surface, and will be emitted through the light-permeable sheet.

2. The meteor projection structure according to claim 1, wherein the quantity of the polygonal reflecting wheel (1) is one, and the quantity of the laser device (2) is at least two.

3. The meteor projection structure according to claim 1, wherein the transmission mechanism (5) is a connecting shaft, and one end of the connecting shaft is connected with the motor (4), and the other end of the connecting shaft is connected with the polygonal reflecting wheel (1), and the motor and transmission mechanism are aligned with the hexagonal prism coaxially.

4. The meteor projection structure according to claim 1, wherein the transmission mechanism (5) comprises several gears and transmission shafts, one end of the transmission shaft is connected with the polygonal reflecting wheel (1), and the other end of the transmission shaft is connected with the gear, and the gear is connected with the motor (4).

5. The meteor projection structure according to claim 1, wherein the transmission mechanism (5) comprises a transmission shaft, a driving pulley, a synchronous pulley and a conveyor belt; one end of the transmission shaft is connected with the polygonal reflecting wheel (1), and the other end of the transmission shaft is connected with the synchronous pulley; the driving pulley is configured on an output shaft of the motor (4), and the conveyor belt is connected with the synchronous pulley and the driving pulley.

6. The meteor projection structure according to claim 1, wherein the quantity of the polygonal reflecting wheels (1)

are multiple, and the quantity of the laser devices (2) correspond to the quantity of the polygonal reflecting wheels (1).

7. The meteor projection structure according to claim 6, wherein the quantity of the motors (4) correspond to the quantity of the polygonal reflecting wheels (1), and one of the motors (4) is fixedly connected with one of the polygonal reflecting wheels (1) through a connecting shaft.

8. The meteor projection structure according to claim 6, wherein the transmission mechanism (5) comprises several gears and transmission shafts, one of the gears is connected with one of the polygonal reflecting wheels (1) through the transmission shaft, and a plurality of the gears are engaged and connected with the motor (4) through the transmission shaft; and the arrangement of a plurality of the polygonal reflecting wheels 1 is arranged side by side.

9. The meteor projection structure according to claim 6, wherein the transmission mechanism (5) comprises several transmission shafts, several synchronous pulleys, driving pulleys and conveyor belts, one end of one of the transmission shafts is connected with one of the polygonal reflecting wheels (1), the other end of the one of the transmission shafts is connected with one of the synchronous pulleys; the driving pulley is configured on an output shaft of the motor (4), and the conveyor belt is connected with the driving pulley and the synchronous pulley; and the arrangement of a plurality of the polygonal reflecting wheels 1 is arranged side by side.

10. The meteor projection structure according to claim 1, wherein the laser device (2) is any one or more of a red laser device, a green laser device, a blue laser device, a blue-violet laser device, a yellow laser device and an infrared laser device.

11. The meteor projection structure according to claim 1, wherein the transmission mechanism (5) is a connecting shaft, and one end of the connecting shaft is connected with the motor (4), and the other end of the connecting shaft is connected with the polygonal reflecting wheel (1) and the meteor projection structure comprises an additional laser device (2) opposite to the laser device (2), which projects twice as many meteors under the same occupied area and rotating speed, thereby obtaining a denser meteor effect.

12. The meteor projection structure according to claim 1, wherein the transmission mechanism (5) comprises several gears and transmission shafts, one end of the transmission shaft is connected with the polygonal reflecting wheel (1), and the other end of the transmission shaft is connected with the gear, and the gear is connected with the motor (4); and the meteor projection structure comprises an additional laser device (2) opposite to the laser device (2), which correspondingly projects twice as many meteors under the same occupied area and rotating speed, thereby obtaining a denser meteor effect.

13. The meteor projection structure according to claim 1, wherein the transmission mechanism (5) comprises a transmission shaft, a driving pulley, a synchronous pulley and a conveyor belt; one end of the transmission shaft is connected with the polygonal reflecting wheel (1), and the other end of the transmission shaft is connected with the synchronous pulley; the driving pulley is configured on an output shaft of the motor (4), and the conveyor belt is connected with the synchronous pulley and the driving pulley; and the meteor projection structure comprises an additional laser device (2) opposite to the laser device (2), which correspondingly projects twice as many meteors under the same occupied area and rotating speed, thereby obtaining a denser meteor effect.

14. The meteor projection structure according to claim 6, wherein the transmission mechanism (5) comprises several gears and transmission shafts, one of the gears is connected with one of the polygonal reflecting wheels (1) through the transmission shaft, and a plurality of the gears are engaged and connected with the motor (4) through the transmission shaft; and the arrangement of a plurality of the polygonal reflecting wheels 1 is arranged in front-back arrangement.

15. The meteor projection structure according to claim 6, wherein the transmission mechanism (5) comprises several transmission shafts, several synchronous pulleys, driving pulleys and conveyor belts, one end of one of the transmission shafts is connected with one of the polygonal reflecting wheels (1), the other end of the one of the transmission shafts is connected with one of the synchronous pulleys; the driving pulley is configured on an output shaft of the motor (4), and the conveyor belt is connected with the driving pulley and the synchronous pulley; and the arrangement of a plurality of the polygonal reflecting wheels 1 is arranged in front-back arrangement.

* * * * *